(12) United States Patent
Coordes (10) Patent No.: US 9,322,396 B2
(45) Date of Patent: Apr. 26, 2016

(54) FOUNDATION FOR A WIND TURBINE

(71) Applicant: Wobben Properties GmbH, Aurich (DE)

(72) Inventor: Thomas Coordes, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/356,545

(22) PCT Filed: Nov. 7, 2012

(86) PCT No.: PCT/EP2012/072035
§ 371 (c)(1),
(2) Date: May 6, 2014

(87) PCT Pub. No.: WO2013/068403
PCT Pub. Date: May 16, 2013

(65) Prior Publication Data
US 2014/0318033 A1    Oct. 30, 2014

(30) Foreign Application Priority Data

Nov. 8, 2011   (DE) .......................... 10 2011 085 947

(51) Int. Cl.
*F03D 11/04*    (2006.01)
*E02D 27/42*    (2006.01)
*E04H 12/34*    (2006.01)

(52) U.S. Cl.
CPC .............. *F03D 11/045* (2013.01); *E02D 27/42* (2013.01); *E04H 12/34* (2013.01)

(58) Field of Classification Search
CPC ..... E02D 27/42; E02D 27/425; Y02E 10/728; E04H 12/00; E04H 12/08; E04H 12/085; E04H 12/2253; E04H 12/2261; E04H 12/2269; E04H 12/2292; E04H 12/24; F03D 1/001; F03D 11/04; F03D 11/045
USPC ............. 52/40, 169.9, 169.13, 170, 292, 296, 52/297, 298, 745.17
See application file for complete search history.

(56) References Cited

U.S. PATENT DOCUMENTS 900,517 A * 10/1908 Glover ........................... 52/298
4,469,956 A * 9/1984 D'Amato ................ F03D 11/04
290/44

(Continued)

FOREIGN PATENT DOCUMENTS

CA     2 695 186 A1   6/2011
CN       1934320 A    3/2007

(Continued)

OTHER PUBLICATIONS

Machine Translation of JP 2007-023626A; obtained from https://www4.j-platpat.inpit.go.jp/cgi-bin/tran_web_cgi_ejje?u=http://www4.jplatpat.inpit.go.jp/eng/translation/2015120301241044022 7729012620630875A8CFF5DE00F62E862D23A69A93CEA50; viewed on Dec. 2, 2015.*

(Continued)

*Primary Examiner* — Joshua J Michener
*Assistant Examiner* — Theodore Adamos
(74) *Attorney, Agent, or Firm* — Seed Intellectual Property Law Group PLLC (57) ABSTRACT

The invention concerns a pylon base section for arrangement and fixing on a foundation and for the erection of a pylon of a wind power installation thereon including an outer lower annular flange for placement on the foundation and for fixing to the foundation, an inner upper annular flange for placement and fixing of a pylon segment with a corresponding lower pylon flange thereon, an inner lower support flange for placement on the foundation, and inner support elements, in particular support struts, for supporting the upper annular flange relative to the lower support flange.

12 Claims, 5 Drawing Sheets

(56) References Cited

U.S. PATENT DOCUMENTS

| | | | |
|---|---|---|---|
| 7,374,369 B2* | 5/2008 | Jakubowski et al. | 405/244 |
| 7,614,200 B2 | 11/2009 | Wobben | |
| 8,051,627 B2* | 11/2011 | Schiffer et al. | 52/854 |
| 8,307,593 B2* | 11/2012 | Bagepalli | 52/223.5 |
| 8,443,557 B2* | 5/2013 | Gevers et al. | 52/170 |
| 8,782,979 B2* | 7/2014 | Tuominen | 52/297 |
| 2005/0072067 A1* | 4/2005 | Wobben | 52/155 |
| 2007/0251187 A1* | 11/2007 | Schiffer et al. | 52/741.14 |
| 2008/0155907 A1* | 7/2008 | Wobben | 52/169.13 |
| 2008/0302038 A1* | 12/2008 | Wobben | 52/296 |
| 2010/0024311 A1* | 2/2010 | Wambeke et al. | 52/40 |
| 2010/0132299 A1* | 6/2010 | Sathian | 52/651.01 |
| 2010/0146890 A1* | 6/2010 | Kristensen | E02D 27/42 52/297 |
| 2011/0138704 A1* | 6/2011 | Bagepalli et al. | 52/147 |
| 2011/0138707 A1* | 6/2011 | Bagepalli | 52/173.1 |
| 2012/0291380 A1* | 11/2012 | Tooman | 52/297 |
| 2013/0199117 A1* | 8/2013 | Tuominen | 52/297 |

FOREIGN PATENT DOCUMENTS

| | | |
|---|---|---|
| DE | 102 26 996 A1 | 4/2003 |
| DE | 102 30 273 B3 | 2/2004 |
| DE | 10 2004 017 006 A1 | 10/2005 |
| DE | 10 2005 044 989 B3 | 12/2006 |
| EP | 1 849 920 A2 | 10/2007 |
| JP | 55-78722 A | 6/1980 |
| JP | 2007023626 A * | 2/2007 |
| RU | 89 543 U1 | 12/2009 |

OTHER PUBLICATIONS

Seidel, "Interpretation of flange connections with high-strength, pre-stressed bolts for wind turbines," Information and discussion event: Bolted joints—New results from research and practice, Darmstadt, May 7, 2003, 21 pages (with English Machine Translation).

* cited by examiner

FOUNDATION FOR A WIND TURBINE

BACKGROUND

1. Technical Field

The present invention concerns a pylon base section for the erection of a wind power installation. The present invention further concerns a pylon base arrangement having a pylon base section. The present invention also concerns a pylon of a wind power installation and a method of erecting a pylon of a wind power installation.

2. Description of the Related Art

Figure 1:
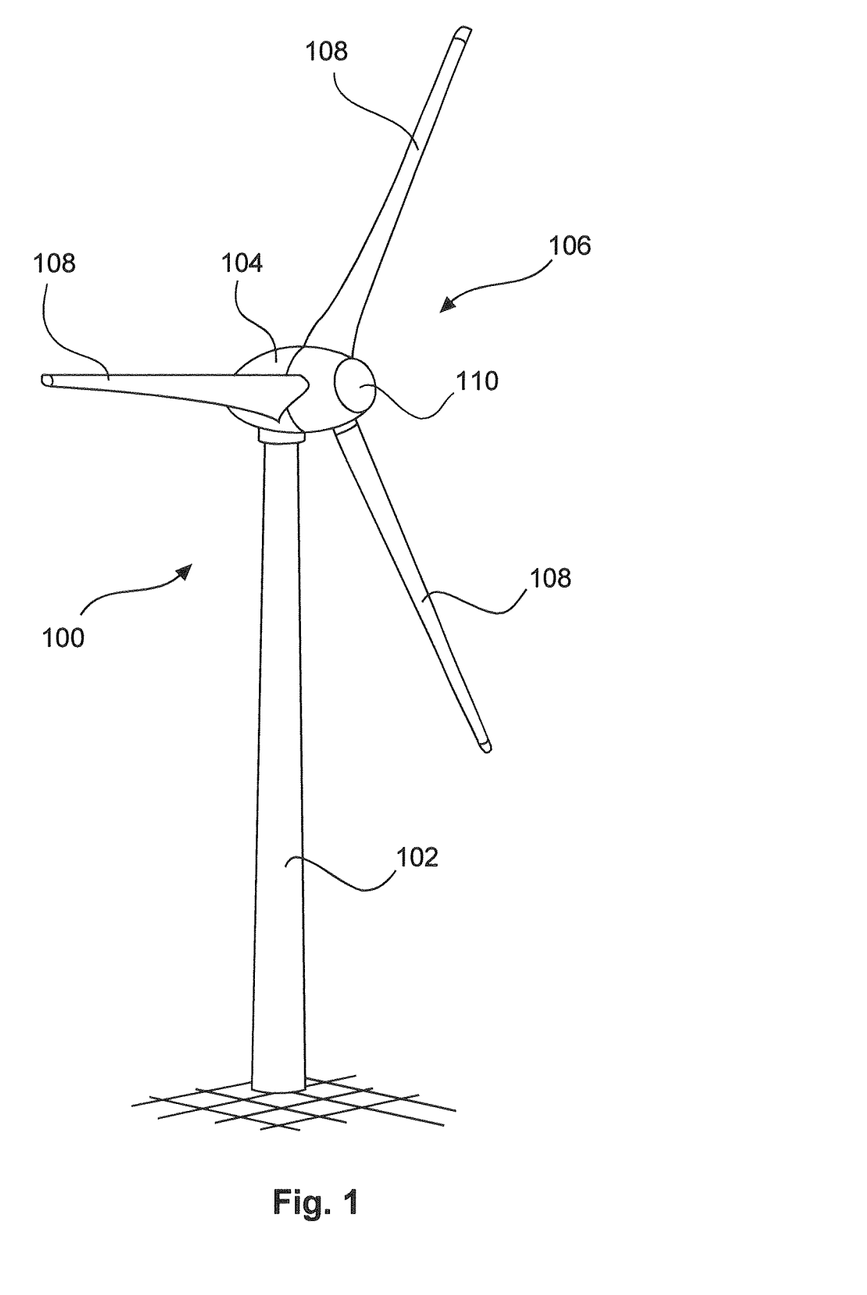
FIG. 1 shows a perspective view of a wind power installation.

Wind power installations are generally known and are frequently erected on a pylon, as is also the case with the wind power installation shown in FIG. 1. Such a pylon of a wind power installation, namely a wind power installation pylon, is erected for that purpose on a suitable foundation. In that case care is also to be taken to provide for perpendicular orientation or levelling of the pylon.

To prepare for erecting a wind power installation pylon it is known for a pylon base section to be partly concreted into the foundation in order to erect the further pylon thereon. Such a pylon base section is in the form of a cylindrical casing or frustoconical casing having an upper peripherally extending annular flange and is concreted into place in such a way that this upper annular flange remains outside the concrete foundation in order to erect the pylon, in particular a steel pylon, thereon. In that case the pylon base section can be held in the aligned or levelled position by a holding device while the concrete foundation is cast. As soon as the concrete has set such a pylon base section can be released from the holding device. Such a method however is intended in particular for smaller pylons and possibly requires later post-levelling on its upper annular flange. Another disadvantage in that respect is that this pylon base section has to be held by the holding device upon pouring and setting of the concrete. That kind of pylon base section can also involve problems in terms of erecting and thus anchoring very large wind power installation pylons.

Another method involves concreting into place a foundation basket having a lower circular segment anchor and a plurality of perpendicular connecting bars arranged in a circular shape, wherein the connecting bars project upwardly from the downwardly disposed segment anchor to which they are connected, through the concrete, and upwardly at the surface of the concrete, where the surface of the concrete or foundation forms a circular fixing region, and the bars are in that case provided with a peripherally extending levelling ring. That levelling ring can be arranged and levelled off after the concrete has set in order to arrange a first pylon segment thereon in properly oriented relationship and to fix it in place. In that arrangement the connecting bars project with threaded portions through corresponding bores in a lower flange of the lower pylon segment and can be provided there with nuts for fixing purposes.

A problem in that respect is that, when pouring the concrete, the connecting bars have to be oriented with a template or jig in the region of the concrete surface or foundation surface to be produced, so that the connecting bars are correctly arranged after the concrete has set and can extend without any problem through the large number of bores in the levelling ring to be arranged, and the flange of the lower pylon segment to be set in place. Such a method is thus complicated and expensive because firstly such a template or jig has to be set in place and, after the concrete has set, has to be replaced by the levelling ring. For that purpose the nut of each connecting bars has to be released to be able to remove the template or jig and then re-fitted after the levelling ring and the lower pylon segment has been set in position. An arrangement with a levelling ring is to be found in German patent application DE 10 2004 017 006 A1.

A problem with that use of a foundation basket with a lower segment anchor and a levelling ring is also that, if the foundation basket is constructed incorrectly or imprecisely, the result can be inclinedly extending connecting bars which can also be referred to as bolts. That can cause problems in further connection of the levelling ring and the first pylon segment to be placed thereon. One cause can involve defective use of an upper template or jig for orienting the bolts.

BRIEF SUMMARY

One or more embodiments of the present invention is to address at least one of the above-mentioned problems. In particular, one embodiment of the invention seeks to propose a solution for improving a pylon base foundation of a wind power installation pylon. Additionally or alternatively the invention seeks to provide that the structure and arrangement of a foundation basket is simplified and/or is less susceptible to defects. One embodiment at least seeks to propose an alternative solution.

According to one embodiment of the invention there is proposed a pylon base section as set forth in claim 1. Such a pylon base section is adapted for arrangement and fixing on a foundation and for the erection of a pylon of a wind power installation thereon. The pylon base section includes an outer lower annular flange for placement on the foundation and for fixing to the foundation. In addition there is provided an inner upper annular flange for placement and fixing of a pylon segment with a corresponding lower pylon flange thereon. In particular that inner upper annular flange (reference is also made thereto hereinafter for the sake of simplicity as the upper annular flange) substantially corresponds to a corresponding lower pylon flange in terms of size and nature and number of bores for passing fixing bolts therethrough.

The pylon base section also has an inner lower support flange for placement on the foundation, wherein that inner lower support flange is also in the form of an annular flange and in particular for the sake of easier understanding is referred as the support flange. In particular the outer lower annular flange and the inner lower support flange are arranged in mutually adjacent relationship and have a common surface in the form of a circular ring to be arranged and placed on the foundation or on a levelling layer on the foundation. In that respect, the term placement on the foundation is used to mean that the pylon base section sits in particular in the finished condition on the foundation. Placement on the foundation is not to be interpreted so narrowly that it is only after complete construction of the foundation that the pylon base section is arranged and placed thereon. Rather this specification will later describe in detail how the pylon base section preferably achieves its position on the foundation.

In addition there are provided inner support elements, in particular support struts, for supporting the upper annular flange relative to the lower support flange. Those support elements are thus disposed between the upper annular flange and the lower support flange and are adapted to transmit a force which acts on the upper annular flange, in particular due to the pylon applying a loading thereto, at least partially to the lower support flange and thus accordingly to the foundation. In addition or alternatively those support elements are intended and are suitable for carrying a bracing force by means of corresponding fixing elements which can act between the inner upper annular flange and the lower support flange when they are braced directly or indirectly relative to each other.

In an embodiment the pylon base section is characterized by an annular casing portion connecting the lower annular flange and the lower support flange to the upper support flange. In particular the casing portion defines an outer region and an inner region. The outer and inner regions basically correspond to an outer and inner pylon region respectively of the wind power installation pylon to be erected. In that case the lower outer annular flange is arranged in the outer region and is thus also visible and accessible from outside the pylon to be erected. In contrast the upper annular flange, the lower support flange and the support elements are arranged in the inner region, that is to say, after erection of a wind power installation pylon, in the interior of the pylon. Preferably the height of the casing portion is 0.2 meters (m) to 2 m, preferably 0.5 m to 1.5 m and particular preferably 0.75 m. That correspondingly involves a spacing of the upper annular flange relative to the lower support flange at one of those respective sizes. When the pylon base section is arranged on the foundation therefore the inner upper annular flange is arranged at approximately that height, that is to say in the range of 0.2 m to 2 m, or 0.5 m to 1.5 m or at 0.75 m. In that way that inner upper annular flange is also at a suitably pleasant and practicable working height for a member of a construction team who is standing on the foundation.

A further configuration provides a pylon base section characterized in that the support elements are in the form of vertical support ribs, wherein in particular the upper annular flange and the lower support flange have a plurality of bores for passing therethrough fixing screws or fixing bolts and each support rib is respectively fixed to the upper annular flange between two of the bores and to the lower support flange also between two of the bores which more specifically correspond to the respective upper two bores. Thus when fixing screws or fixing bolts are respectively passed in the appropriate required fashion through a bore in the lower support flange and the upper annular flange at least one respective fixing screw or fixing bolt is arranged between two support ribs. When now the fixing screws or bolts are tightened and exert a tensile force which also leads to a tensile force between the lower support flange and the upper annular flange the support ribs can counteract that force and correspondingly counteract deformation of the two flanges.

In a configuration there are no bores between some support ribs, in particular there can be more support ribs than corresponding bores.

According to one embodiment of the invention there is also proposed a pylon base arrangement which includes a pylon base section, namely a pylon base section according to one embodiment as described hereinbefore. In addition the pylon base arrangement includes a foundation basket having inner and outer fixing bolts for anchoring with one respective side in a foundation and for fixing with another respective side at the pylon base section. The inner fixing bolts in that case are longer approximately by the height of the pylon base section than the outer fixing bolts. At least the inner fixing bolts are longer in respect of their operative length by the height of the pylon base section than the outer fixing bolts. Accordingly in particular the fixing bolts are to be arranged in the foundation at the same height and are thus fixed after the concrete has set, more specifically in particular at an approximately horizontally arranged segment anchor peripherally extending in a circular shape. In that arrangement the outer fixing bolts extend from the segment anchor to and through the outer lower annular flange. The inner fixing bolts extend from the segment anchor to and through the inner lower support flange and also to and through the inner upper annular flange. After a lower pylon segment has been arranged on the pylon base section with a lower pylon flange the inner fixing bolts also still project through that lower pylon flange of the lower pylon segment. The effective length of the connecting bolts is that which is necessary to produce a connection between the segment anchor and the outer lower annular flange and between the segment anchor and the inner upper annular flange. Upon very close consideration, in the latter case, that is to say for the inner connecting bolts, the thickness of the lower pylon flange of the lower pylon segment to be set in place is also added.

In an embodiment of the pylon base arrangement therefore the outer fixing bolts are passed for fixing to the pylon base section through bores in the outer lower annular flange and the inner fixing bolts are passed through bores in the inner lower support flange and through bores in the upper inner annular flange. In that case the inner fixing bolts are intended to be adapted for fixing a pylon segment to be set in place with a lower pylon flange on the inner upper annular flange in order in that case more specifically to be passed through bores in the lower pylon flange.

A further configuration of a pylon base arrangement according to one embodiment of the invention provides a plurality of connecting bolts for connecting the pylon base section to a lower pylon segment placed on the pylon base section. In this case the connecting bolts extend through the inner upper annular flange and the corresponding lower pylon flange of the fitted pylon segment. In particular the connecting bolts do not extend into the foundation. Such a pylon base arrangement thus has outer fixing bolts which extend into the foundation for anchoring the outer lower annular flange. In addition there are inner fixing bolts which extend from the lower pylon flange of the fitted pylon segment further through the inner upper annular flange and from there further through the inner lower support flange into the foundation. In addition to those inner and outer fixing bolts there are provided connecting bolts which connect the inner upper annular flange to the lower pylon flange and are preferably also of a correspondingly short configuration. Basically therefore those connecting bolts extend through those two flanges which bear against each other, namely the inner upper annular flange and a lower pylon flange, and accordingly at both ends still have sufficient space for arranging a respective clamping means such as a clamping nut. Such a clamping nut can also be referred to as a nut for simplification purposes.

Preferably connecting bolts and fixing bolts which both respectively extend through the inner upper annular flange and the lower pylon flange alternate. Thus in relation to a peripheral direction, the lower pylon flange of the lowermost fitted pylon segment is alternately anchored in or braced in relation to the foundation on the one hand with an inner fixing bolt and on the other hand is fixed to or braced in relation to the inner upper annular flange with a connecting bolt. In other words, long inner fixing bolts and short connecting bolts alternate in the interior of the pylon base arrangement.

It is also possible to provide more inner fixing bolts than connecting bolts or vice-versa. In addition or alternatively inner fixing bolts on the one hand and connecting bolts on the other hand can also be arranged in pair-wise relationship so that in the peripheral direction two connecting bolts follow two inner fixing bolts and the two connecting bolts are in turn followed by two inner fixing bolts and so forth, to give just one further example.

For the use of connecting bolts which therefore do not extend through the inner lower support flange, it is also possible to use a pylon base section which is also intended for a pylon base arrangement without connecting bolts. In other words it is also possible to use for this embodiment, being a pylon base arrangement which uses connecting bolts, a pylon base section which in its inner upper annular flange has as many bores as in its inner lower support flange. Then some bores in the inner lower support flange would not have any bolt passing therethrough and in that respect would remain empty. Naturally such bores which remain empty in that respect can however be filled with a filling material if that is desired.

Alternatively it is possible to use a pylon base section which is specifically designed and adapted for a pylon base arrangement which uses connecting bolts.

A pylon base arrangement which uses connecting bolts can thus provide for the application of force from the pylon, in particular from the lower pylon segment, into the foundation, in two ways. The transmission of force, that is to say in particular tensile forces, can thus be implemented on the one hand from the lower pylon segment directly by way of the inner fixing bolts into the foundation. In addition, such forces can be in part passed to the pylon base section by way of the connecting bolts and from the pylon base section further by means of the outer fixing bolts into the foundation. In that respect, such anchorage in the foundation is possible with a comparatively low level of material expenditure, in particular as regards the number of bolts and bracing means such as bracing nuts. A comparatively small number of bracing means such as bracing nuts can also reduce the complication and expenditure when erecting such a pylon base arrangement.

Preferably a pylon base arrangement has as many outer fixing bolts as inner fixing bolts and/or it has as many outer fixing bolts as inner fixing bolts and connecting bolts together.

In addition there is proposed a pylon of a wind power installation according to claim 10. It has a foundation having a foundation basket with outer and inner fixing bolts and with a pylon base section according to one of the above-described embodiments. The pylon further has a lower pylon segment, in particular a steel pylon segment, with a lower pylon flange. In that arrangement the lower pylon segment is disposed with its pylon flange on the pylon base section. Some of the fixing bolts, in particular the inner fixing bolts, are passed from the foundation through the inner lower support flange and through the inner upper annular flange of the pylon base section and through the lower pylon flange in order thereby to arrange the lower pylon flange on the pylon base section and to fix it to the foundation. Fixing is effected in particular by screwing and tightening fixing nuts on the fixing bolts which project upwardly through the lower pylon flange.

Thus the inner fixing bolts provide for directly fixing or bracing the lower pylon segment to the foundation, in particular a segment anchor provided in the foundation. In this case the pylon base section is arranged between the foundation and the pylon segment and the inner connecting bolts thus project completely beyond the pylon base section.

According to another embodiment of the invention there is proposed a method of erecting a pylon of a wind power installation, in particular a steel pylon, according to claim 12. This accordingly firstly involves positioning a foundation basket connected to a pylon base section in a foundation excavation prepared for pouring a foundation. Concrete can then be poured into the foundation excavation for partially concreting the foundation basket in place. In that case the pouring operation is preferably effected as far as possible in such a way that a concrete surface, that is to say a foundation surface, is produced somewhat shortly below the pylon base section, namely shortly below the lower flanges of the pylon base section. Preferably there should be just so much space remaining between the concrete surface and the underside of the pylon base section, that levelling by a levelling material or compensating material can still be effected.

The concrete will then set and after the concrete has set construction of the pylon can be continued, or, depending on the respective way in which the situation is considered, such construction can be begun. One of the next steps in constructing the pylon is placement and fixing of a lower pylon segment. Depending on the respective size of the pylon the lower pylon segment can also be the sole pylon segment on which then a wind power installation pod or at least an azimuth bearing is fitted.

Preferably the method of erecting a pylon of a wind power installation uses a pylon base section in accordance with one of the described embodiments. Preferably the pylon basket is connected to the pylon base section in the positioning operation by way of fixing bolts. In that case inner fixing bolts are passed through bores in the upper inner annular flange and fixed there with fixing means, in particular suitable nuts.

Preferably the pylon base section is held by a crane or a carrier frame set up in the foundation excavation, in the operation of pouring the concrete, whereby in addition the foundation basket which is fixed to the pylon base section is also held. In that case the foundation basket is basically suspended from the pylon base section.

Preferably the pylon base section is levelled after the concrete has set. The pylon base section is thus oriented straight to permit the pylon to be constructed as exactly vertically as possible. For that purpose for example a self-levelling material can be applied to the foundation beneath the two lower flanges of the pylon base section and, after the self-levelling levelling material has hardened, the pylon base section can be set down thereon. Alternatively the pylon base section as such can be levelled off and the levelled-off position of the pylon base section can be fixed by a suitable compensating material. In this case also that compensating material is to be arranged in the region between the foundation and the lower flanges of the pylon base section in order to harden there in the levelled position. Optionally, depending on the respective concrete foundation, it is possible to dispense with the levelling operation, or levelling can be effected without the compensating or levelling material. In that case the pylon base section stands directly on the foundation. The outer fixing bolts can then be fixedly braced, namely in particular with suitably fitted nuts. In the case of the inner fixing bolts, upper nuts can now be released and a lower pylon section can be placed with a lower pylon flange on the pylon base section, in which case the inner fixing bolts are passed through bores in the lower pylon flange and then can be firmly tightened by suitable nuts.

This therefore provides that at any event the outer nuts, namely the nuts of the outer fixing bolts, no longer have to be also released after pouring of the concrete and after the levelling-off operation, but only still have to be tightened. This can therefore eliminate replacement of a template or jig. The pylon base section can be held without a crane in the concrete pouring operation, or requires only a very small crane so that this can reduce corresponding costs for crane time. In that procedure a pylon base section is arranged between the foundation and the lower pylon segment, and is fixed together with the lower pylon segment to the foundation at any event in the inner region, in particular being fixedly braced thereto. The proposed solution avoids at any event in the inner region fixing of the pylon base section to the foundation on the one hand and fixing of the lower pylon section to the pylon base section on the other hand. It is thus possible here to save on two sets of nuts and the corresponding working time for arranging them and screwing them tight. In particular it is possible here to achieve a reduction in complication and expenditure and also material.

In particular placement and fixing of a lower pylon segment are effected in such a way that the fixing means, therefore in particular nuts, are removed from the inner fixing bolts, the lower pylon segment is placed with a lower pylon flange on the inner upper annular flange of the pylon base section and in that case the inner fixing bolts are passed through bores in the lower pylon flange. The fixing means, in particular fixing nuts, are then screwed onto the inner fixing bolts projecting through the pylon flange in order to pull the pylon flange fixedly onto the upper inner annular flange of the pylon base section.

BRIEF DESCRIPTION OF THE SEVERAL VIEWS OF THE DRAWINGS

The invention is described in greater detail hereinafter by way of example by means of embodiments with reference to the accompanying Figures.

DETAILED DESCRIPTION

Hereinafter the same references are possibly used for similar but non-identical features to improve understanding of the functionality of the respective components.

FIG. 1 shows a wind power installation 100 comprising a pylon 102 and a pod 104. Arranged on the pod 104 is a rotor 106 having three rotor blades 108 and a spinner 110. In operation the rotor 106 is caused to rotate by the wind and thereby drives a generator in the pod 104.

Figure 2:
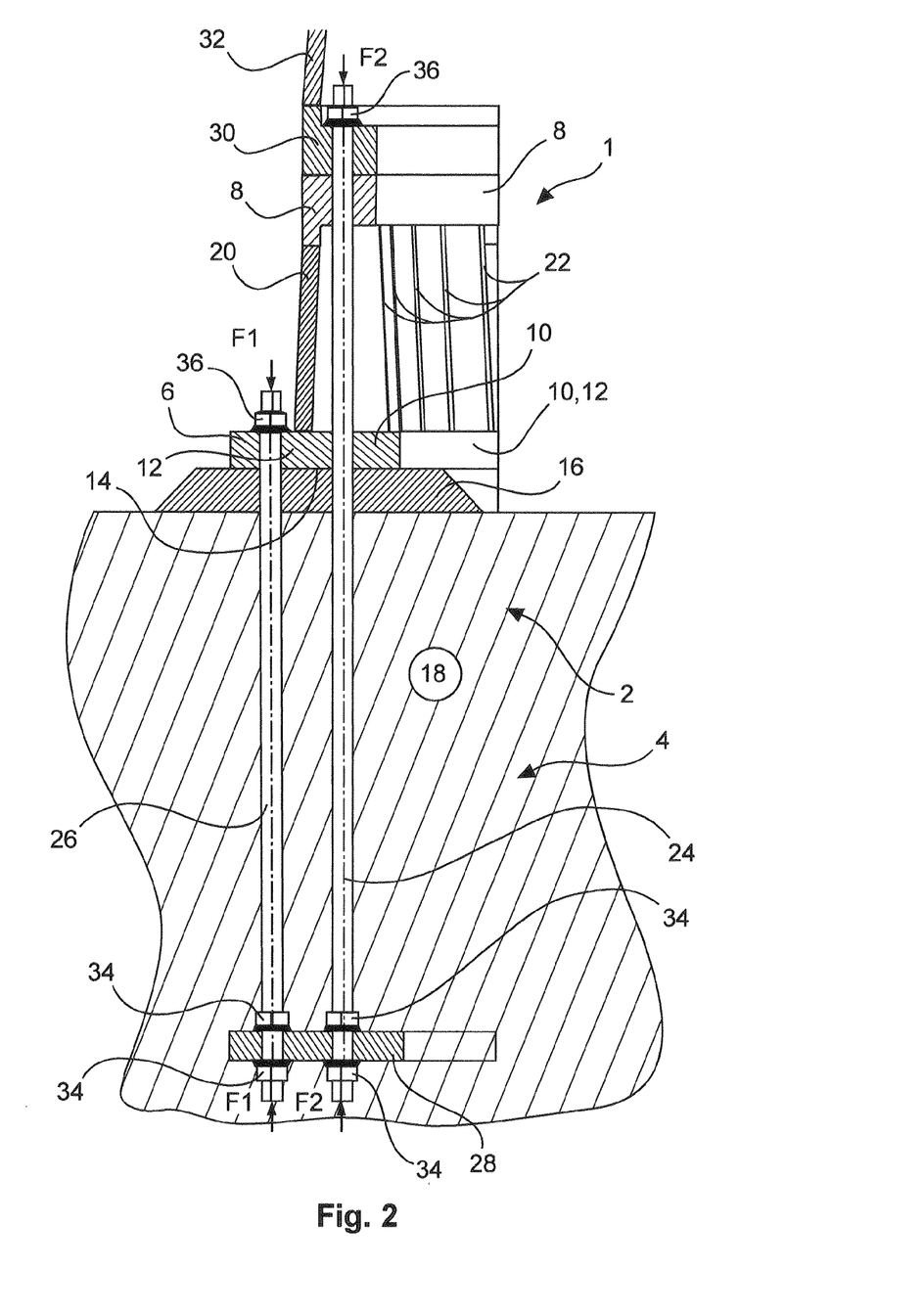
FIG. 2 shows a sectional view through a part of a pylon base arrangement according to an embodiment of the invention, FIG. 3 diagrammatically shows a perspective view of a pylon base section without pylon, without foundation and without foundation basket, FIG. 4 diagrammatically shows a perspective view of a pylon base section with foundation basket and with a pylon flange, FIG. 5 diagrammatically shows a pylon base section with foundation basket and a peripherally extending compensating layer for levelling purposes, wherein the concrete on which the compensating layer is arranged is not shown, FIG. 6 diagrammatically shows a perspective view of a pylon base section which is appropriately arranged on a foundation and a compensating layer.

The pylon base arrangement 2 in FIG. 2 includes a pylon base section 1 and a pylon basket 4 which can also be referred to as a bolt basket.

The pylon base section 1 includes an outer lower annular flange 6, an inner upper annular flange 8 and a lower inner support flange 10 which is also in the form of an annular flange. The outer lower annular flange 6 and the lower inner support flange 10 basically together form a lower annular base portion 12. That lower annular base portion 12 can be made from one piece, in particular of steel, and has a lower support surface 14 with which the pylon base section 1 stands on an annularly arranged compensating layer 16 which in turn is arranged on a foundation 18.

The lower annular base portion 12 is connected to the upper inner annular flange 8 by way of an annular casing portion 20.

The annular casing portion 20 is almost in the form of a cylindrical casing, but differs therefrom by virtue of a conical configuration and thus corresponds to a frustoconical peripheral casing. The lower annular base portion 12, the annular casing portion 20 and the upper inner annular flange 8 are provided in FIG. 2 with different hatchings in the illustrated sectional view. Nonetheless those three portions 12, 20 and 8 are fixedly connected together, in particular by welding. All three portions 12, 20 and 8 can be made from steel and they can be in the form of a common casting.

The pylon base section 1 in FIG. 2 also has support elements 22 of which five support elements 22 are shown in FIG. 2. The support elements 22 can also be referred to as support struts or reinforcing plates. The support elements 22 are disposed between the upper inner annular flange 8 and the lower inner support flange 10 and are fixedly connected to both and to the annular casing portion 20, in particular by welding, or are produced jointly as a casting. Forces acting on the upper inner annular flange 8 can be transmitted by way of those support elements 22 and also the annular casing portion 20 to the lower annular base portion. In particular such forces are passed from the support elements 22 to the lower inner support flange 10 and are also passed from the annular casing portion 20 to the lower annular base portion or the outer lower annular flange.

The foundation basket 4 includes a multiplicity of inner bolts 24 and outer bolts 26. The inner bolts 24 and the outer bolts 26 are respectively arranged in an annular row in the foundation 18 and are fixed at a lower end to a segment anchor 28 which also correspondingly peripherally extends in an annular configuration in an approximately horizontal plane in the foundation 18 and which can also be referred to as the anchor ring. Arranged on the upper inner annular flange 8 and thus on the pylon base section 1 is a lower pylon flange 30 which forms a lower part of an indicated lower pylon section 32.

The foundation basket 4 is now of such a structure that the inner bolts 24 extend from the segment anchor 28 through the foundation 18 upwardly through the compensating layer 16, the inner lower support flange 10, the upper inner annular flange 8 and finally through the lower pylon flange 30. Those inner bolts 24 which are in the form of threaded bolts are fixed to the segment anchor 28 by means of nuts 34. The lower pylon flange 30 is thus braced in relation to the segment anchor 28 with further nuts 36 which can be identical to the nuts 34. In that way a pylon of which the lower pylon section 32 is indicated in FIG. 2 is also fixedly connected to the segment anchor and thus the foundation.

The outer bolts 26 are also fixed to the segment anchor 28 with nuts 34 and project upwardly through the foundation 18, through the compensating layer 16 and through the outer lower flange 6 to which they are fixed by means of nuts 36.

Figure 3:
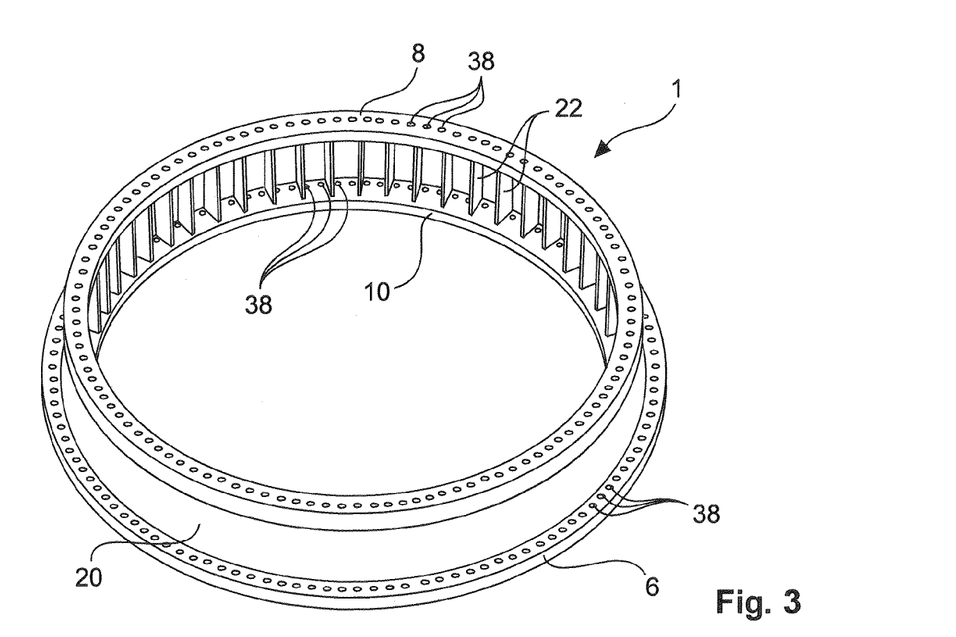

FIG. 3 shows a diagrammatic perspective view of a pylon base section 1. This pylon base section 1 substantially corresponds to the pylon base section 1 shown in the sectional view in FIG. 2. It will be seen from FIG. 3 that the support elements 22 are in the form of support struts or reinforcing plates and are respectively arranged in the region of the lower inner support flange 10 and the upper inner annular flange 8 between two respective bores 38. In this case there are two respective bores 38 on the lower inner support flange 10 and the upper inner annular flange 8, disposed between two support elements 22. In other words there is a respective support element 22 after each second bore 38. The pylon base section can also be made in the form of a casting, in particular a steel casting.

Figure 4:
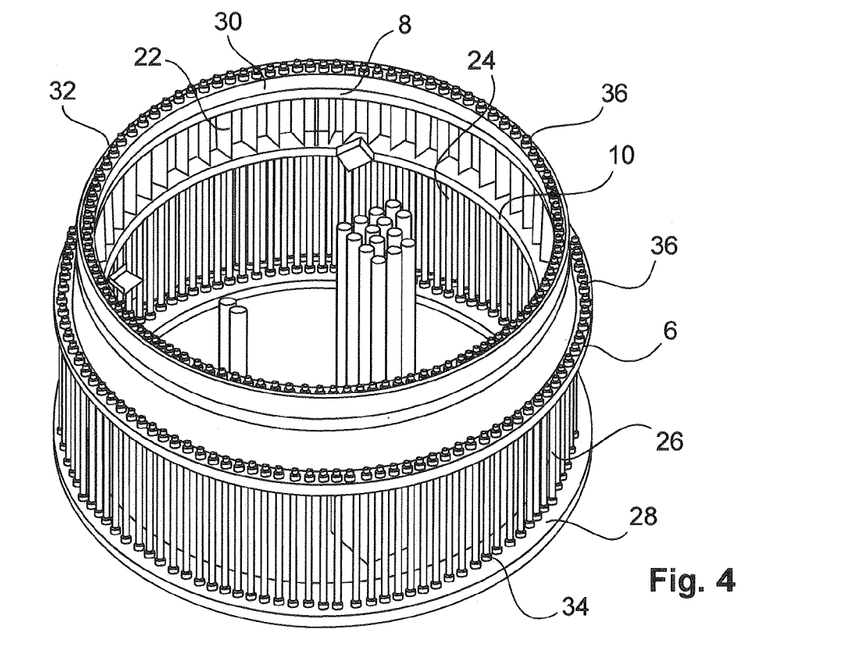
Figure 5:
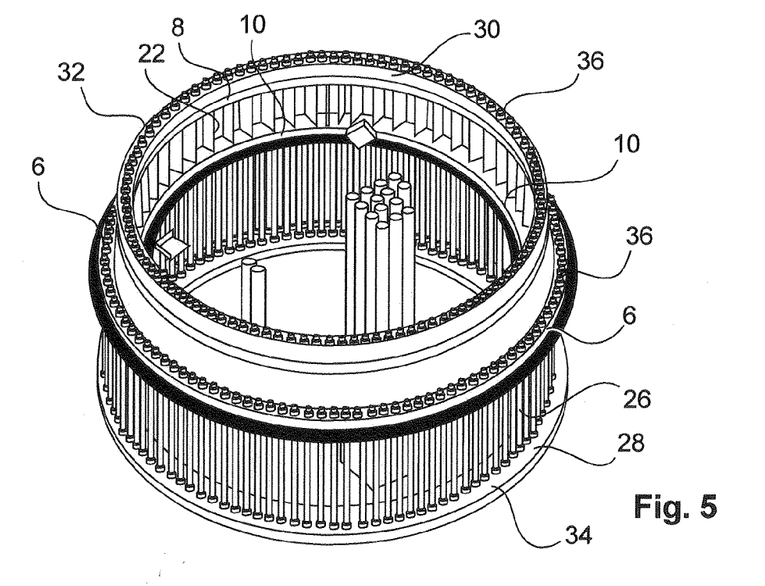
Figure 6:
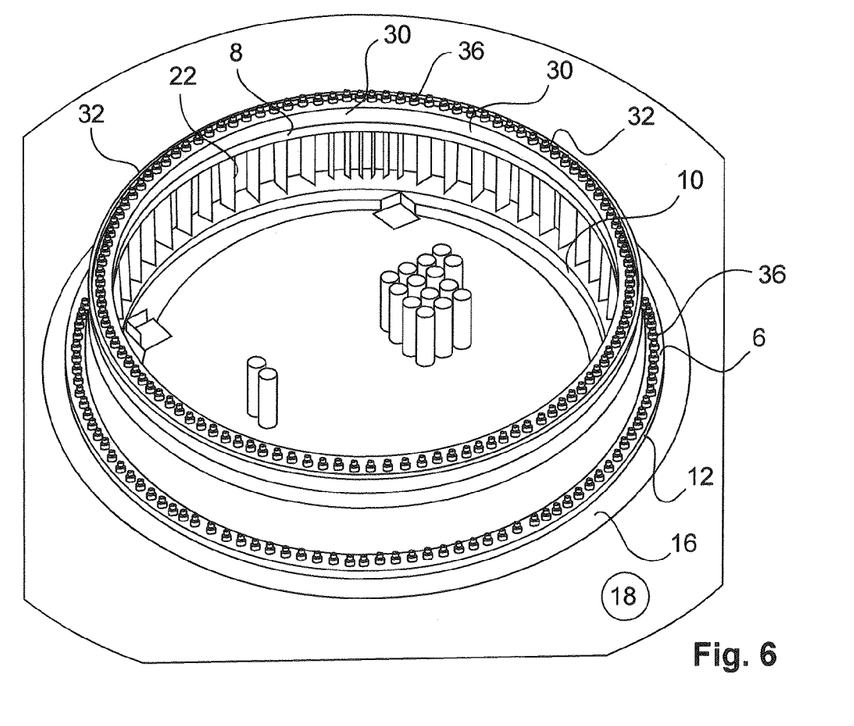

FIGS. 4 to 6 basically show a perspective view of the same pylon base arrangement 2, wherein that shown in FIG. 6 is appropriately cast into a concrete foundation 18 and in that case rests with its lower annular base portion 12 on a compensating layer 16.

The concrete is not shown in the view in FIG. 5, but is shown in the view in FIG. 6. In addition the compensating layer 16 is not shown in the view in FIG. 4.

Each of FIGS. 4 to 6 also shows a lower pylon flange 30 with the attachment of a lower pylon section 32. The largest part of the pylon section 32 is cut out in order to more clearly show the details of the pylon base arrangement 2.

One or more embodiments described thus makes it possible to achieve a simpler and more secure and reliable structure for the foundation baskets and assembly times can be reduced. It is possible to provide for pre-assembly of the foundation basket with steel segment without templates or jigs so that the operation of removing the templates or jigs can be eliminated. Damage to the foundation and thus restoration operations on the foundation can be avoided by virtue of a simpler and more reliable and in particular also better reproducible structure for the foundation basket.

Figure 7:
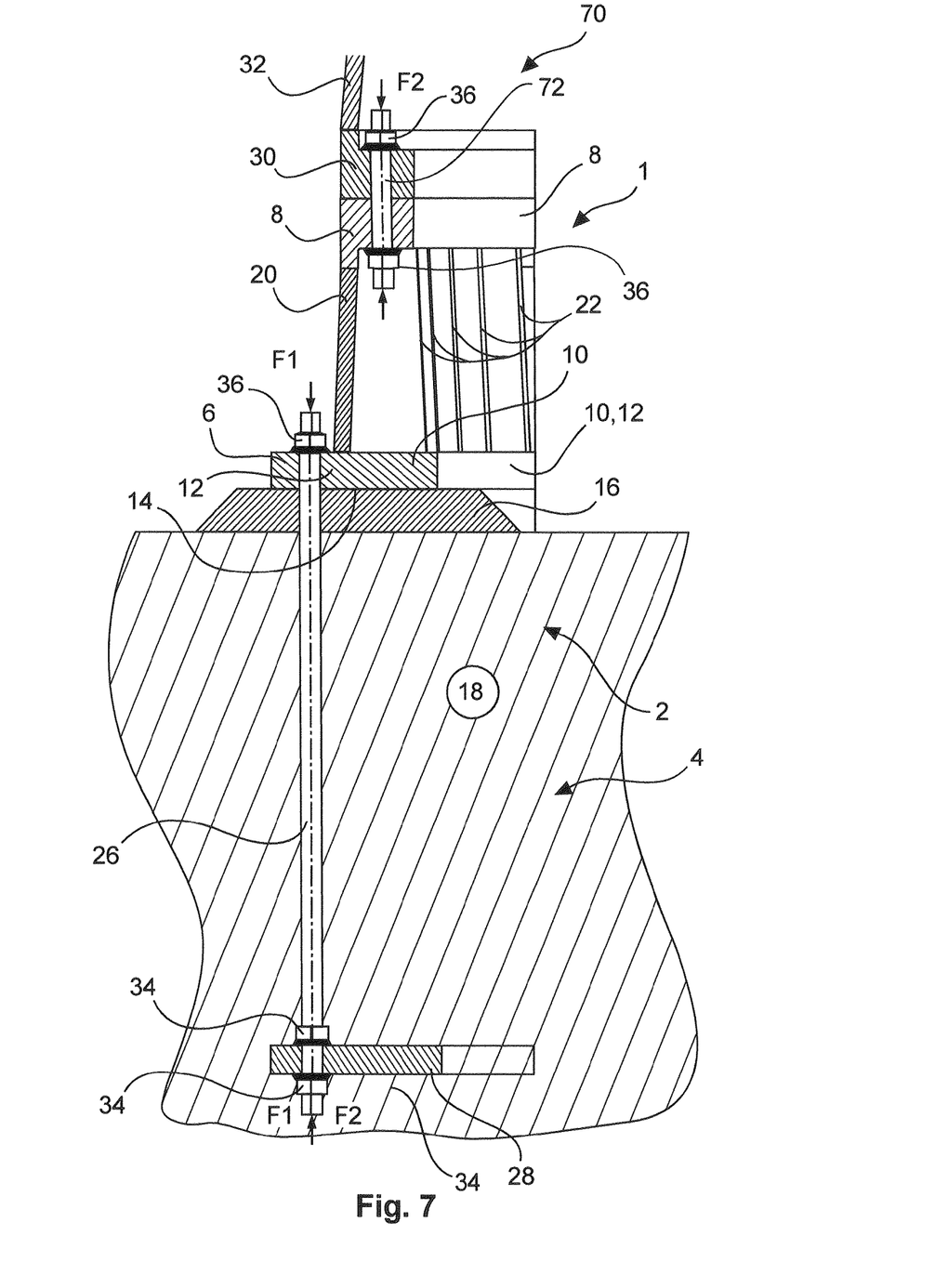
FIG. 7 shows a sectional view through a part of a pylon base arrangement according to a further embodiment.

FIG. 7 shows a section through a pylon base arrangement 70 according to a further embodiment. This sectional view in FIG. 7 substantially corresponds to the sectional view in FIG. 2. The same components are also entirely similar or even identical and in that respect identical references are used here for similar or even identical components although the base arrangement 70 as such differs from the base arrangement 2 in FIG. 2, as follows.

Instead of the inner fixing bolt 24 in FIG. 2, FIG. 7 shows a connecting bolt 72. The connecting bolt 72 is markedly shorter than the inner fixing bolt 24 in FIG. 2. The connecting bolt 72 extends through the lower pylon flange 30 and the upper inner annular flange 8. Those two flanges 30 and 8 are thus fixedly connected together or braced relative to each other by the connecting bolts 72. For that purpose the connecting bolt 72 has two screw nuts or bracing nuts 36. A tensile force from the lower pylon section 32 can be passed in the illustrated region by way of the lower pylon flange 30, the connecting bolt 72, the upper inner annular flange, the annular casing portion 20 of the pylon base section 1 to the outer lower annular flange 6 and from there further to the foundation 18 by means of the outer bolt 26.

FIG. 7 shows a sectional view of a connecting bolt 72. Such connecting bolts 72 alternate with inner bolts 24, in accordance with the illustrated pylon base arrangement 70. Therefore the sectional view in FIG. 2 also shows a pylon base arrangement 70 to which FIG. 7 relates, namely for all the sections which are made in the region of an inner bolt 24.

At the locations at which a connecting bolt 72 in accordance with the pylon base arrangement 70 is used, a bore both in the lower inner support flange 10 and also in the segment anchor 28 can remain unused and possibly filled, or the lower inner support flange 10 and/or the segment anchor 28 can be correspondingly provided, but without a bore.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An assembly comprising:
a foundation;
a lower annular flange for placement above the foundation and configured to be fixed to the foundation, the lower annular flange including an inner portion having first openings and an outer portion having second openings;
a pylon segment that includes a lower pylon flange having third openings;
an inner upper annular flange for placement and fixing to the lower pylon flange of the pylon segment, the inner upper annular flange having fourth openings;
an anchor in the foundation, the anchor having fifth and sixth openings;
outer fixing bolts that extend through the second openings in the outer portion of the lower annular flange and through the fifth openings in the anchor in the foundation;
inner fixing bolts that extend through the first openings in the inner portion of the lower annular flange, the fourth openings in the inner upper annular flange, the third openings in the lower pylon flange of the pylon segment, and the sixth openings in the anchor in the foundation; and
inner support elements having a first end coupled to the inner upper annular flange and a second end coupled to the inner lower support flange and configured to provide support to the inner upper annular flange.

2. The assembly according to claim 1 further comprising an annular casing portion coupling the outer lower annular flange and the inner lower support flange to the inner upper annular flange, wherein the casing portion defines an outer region and an inner region, and wherein the outer lower annular flange is arranged in the outer region, and wherein the inner upper annular flange, the inner lower support flange, and the support elements are arranged in the inner region.

3. The assembly according to claim 2 wherein the height of the casing portion is 0.2 m to 2 m.

4. The assembly according to claim 1 wherein the inner support elements are vertical support ribs, wherein each vertical support rib is respectively fixed to the inner upper annular flange between two of the openings in the inner upper annular flange and to the inner lower support flange between two of the openings in the inner portion of the inner lower support flange.

5. The assembly according to claim 1 wherein the inner fixing bolts have a first longitudinal length and the outer fixing bolts have a second longitudinal length, the first longitudinal length is greater than the second longitudinal length.

6. The assembly according to claim 1 wherein the inner and outer fixing bolts are respectively provided with clamping means to brace the inner upper annular flange and the lower pylon flange of the pylon segment relative to each other.

7. The assembly according to claim 6 wherein the clamping means are clamping nuts.

8. A wind power installation comprising:
an assembly according to claim 1; and
a pylon arranged on the pylon segment.

9. The wind power installation according to claim 8 wherein the inner fixing bolts have a first longitudinal length and the outer fixing bolts have a second longitudinal length, the first longitudinal length is greater than the second longitudinal length.

10. A method of erecting a pylon of a wind power installation, the method comprising:

positioning a foundation basket that includes a segment anchor in a foundation excavation prepared for pouring a foundation;

coupling the foundation basket to a pylon base section by:

coupling a first end of an outer fixing bolt to the segment anchor and a second end of the outer fixing bolt to an outer lower annular flange of a lower annular flange located above the foundation basket;

coupling a first end of an inner fixing bolt to the segment anchor; and         placing a second end of the inner fixing bolt through openings in an inner lower annular flange of the lower annular flange, and openings in an inner upper annular flange, wherein the inner fixing bolt has a length that is greater than the outer fixing bolt;

after coupling the foundation basket to the pylon base section, pouring concrete into the foundation excavation for partially concreting the foundation basket in place;

letting the cast concrete set; and placing the second end of the inner fixing bolt through openings in a lower pylon segment and fixing the pylon base section to the lower pylon segment.

11. The method according to claim 10 wherein:

coupling the first ends of the inner and outer fixing bolts to the segment anchor comprises fixing with fixing means;

upon pouring the concrete, the pylon base section is held by a crane or a carrier frame set up in the foundation excavation;

after setting of the concrete, the pylon base section is levelled; and wherein fixing the pylon base section to the lower pylon segment comprises coupling fixing means to the inner fixing bolts projecting through openings in the lower pylon segment.

12. The method according to claim 11, wherein the fixing means are nuts.

\* \* \* \* \*